US006891798B1

(12) United States Patent
Yip et al.

(10) Patent No.: US 6,891,798 B1
(45) Date of Patent: May 10, 2005

(54) ESTIMATING EQUIVALENT BANDWIDTH CAPACITY FOR A NETWORK TRANSPORT DEVICE USING ON-LINE MEASUREMENTS

(75) Inventors: Man Pak Yip, Sunnyvale, CA (US); Madhav V. Marathe, Cupertino, CA (US); David Anthony Hughes, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/496,520

(22) Filed: Feb. 2, 2000

(51) Int. Cl.[7] .............................. H04J 3/14; H04L 12/56
(52) U.S. Cl. ....................... 370/230; 370/235; 370/252; 370/395.21
(58) Field of Search .............................. 370/229, 230, 370/230.1, 231, 232, 233, 234, 235, 235.1, 252, 253, 395.1, 395.2, 395.21, 395.4, 395.42, 395.43, 412, 415, 428, 468; 709/232, 234, 238, 240, 250; 710/29, 37; 714/29, 37

(56) References Cited

U.S. PATENT DOCUMENTS

| | | | |
|---|---|---|---|
| 5,153,877 A | * | 10/1992 | Esaki et al. .................. 370/389 |
| 5,677,907 A | * | 10/1997 | Hamada et al. ............. 370/253 |
| 5,764,626 A | * | 6/1998 | VanDervort ................. 370/232 |
| 5,812,526 A | * | 9/1998 | Chang et al. ............... 370/230 |
| 5,881,049 A | | 3/1999 | Beshai et al. |
| 5,917,804 A | | 6/1999 | Shah et al. |
| 6,028,840 A | | 2/2000 | Worster |
| 6,041,039 A | | 3/2000 | Kilkki et al. |
| 6,067,287 A | * | 5/2000 | Chung-Ju et al. ........... 370/232 |
| 6,167,030 A | | 12/2000 | Kilkki et al. |
| 6,222,824 B1 | | 4/2001 | Marin et al. |
| 6,240,066 B1 | * | 5/2001 | Nagarajan et al. .......... 370/230 |
| 6,314,085 B1 | * | 11/2001 | Saranka ...................... 370/230 |
| 6,324,166 B1 | * | 11/2001 | Yokoyama et al. ......... 370/234 |
| 6,442,138 B1 | * | 8/2002 | Yin et al. ................... 370/232 |
| 6,477,167 B1 | * | 11/2002 | Wu ........................ 370/395.21 |
| 2002/0057649 A1 | | 5/2002 | Kinnunen |

FOREIGN PATENT DOCUMENTS

WO    WO 99/65194    12/1999

OTHER PUBLICATIONS

Mario P. Saltouros, A Scalable QOS–Based Routing Scheme For ATM Networks Using Reinforcement Learnin Algorithms, Athens, Greece 1999 (www.erudit.de/erudit/events/esit99/programme.html).

* cited by examiner

Primary Examiner—Alpus H. Hsu
(74) Attorney, Agent, or Firm—Blakely, Sokoloff, Taylor & Zafman LLP

(57) ABSTRACT

A method and apparatus are described for determining an equivalent capacity of a transport device in a network switch for a traffic data stream. A data collector collects at least one traffic parameter for the traffic data stream arriving at a queue of the transport device for a specified quality of service (QoS) class. A bandwidth estimator is coupled to the data collector to estimate an effective bandwidth using the at least one traffic parameter. The estimated effective bandwidth corresponds to the equivalent capacity of the transport device.

46 Claims, 5 Drawing Sheets

US 6,891,798 B1

ESTIMATING EQUIVALENT BANDWIDTH CAPACITY FOR A NETWORK TRANSPORT DEVICE USING ON-LINE MEASUREMENTS

FIELD OF THE INVENTION

This invention relates to computer networks. In particular, the invention relates to bandwidth estimation.

THE BACKGROUND OF THE INVENTION

Broadband ISDN (B-ISDN) is rapidly becoming the technology of choice for wide area terrestrial networking. In particular, Asynchronous Transfer Mode (ATM) networking is most popular. The promises include high bandwidth, high quality of service (QoS), and low latency. Advances in the physical propagation of digital information and the use of cell switching make this possible.

B-ISDN specifies several different service classes, each with its own QoS requirement. Specific levels of throughput, loss, delay, and jitter are to be met for some portion of the network users. This adds complexity in managing the flow of traffic data through an ATM network.

It is important to determine the minimum amount of bandwidth resource needed for a service class to meet its QoS commitment. Traditional techniques use some models of the traffic profile to predict the effective bandwidth. There are a number of disadvantages in the traditional model-based approaches. First, real life traffic usually operates much below the maximum allowable traffic envelope, resulting in under-subscription and poor bandwidth utilization. Second, model-based approaches are not flexible and cannot accommodate changes in the network traffic profile.

SUMMARY OF THE INVENTION

A method and apparatus are described for determining an equivalent capacity of a transport device for a traffic data stream. A data collector collects at least one traffic parameter for the traffic data stream arriving at a queue in the transport device for a specified quality of service (QoS) class. A bandwidth estimator is coupled to the data collector to estimate an effective bandwidth using the at least one traffic parameter. The estimated effective bandwidth corresponds to the equivalent capacity of the transport device.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

Figure 1A:
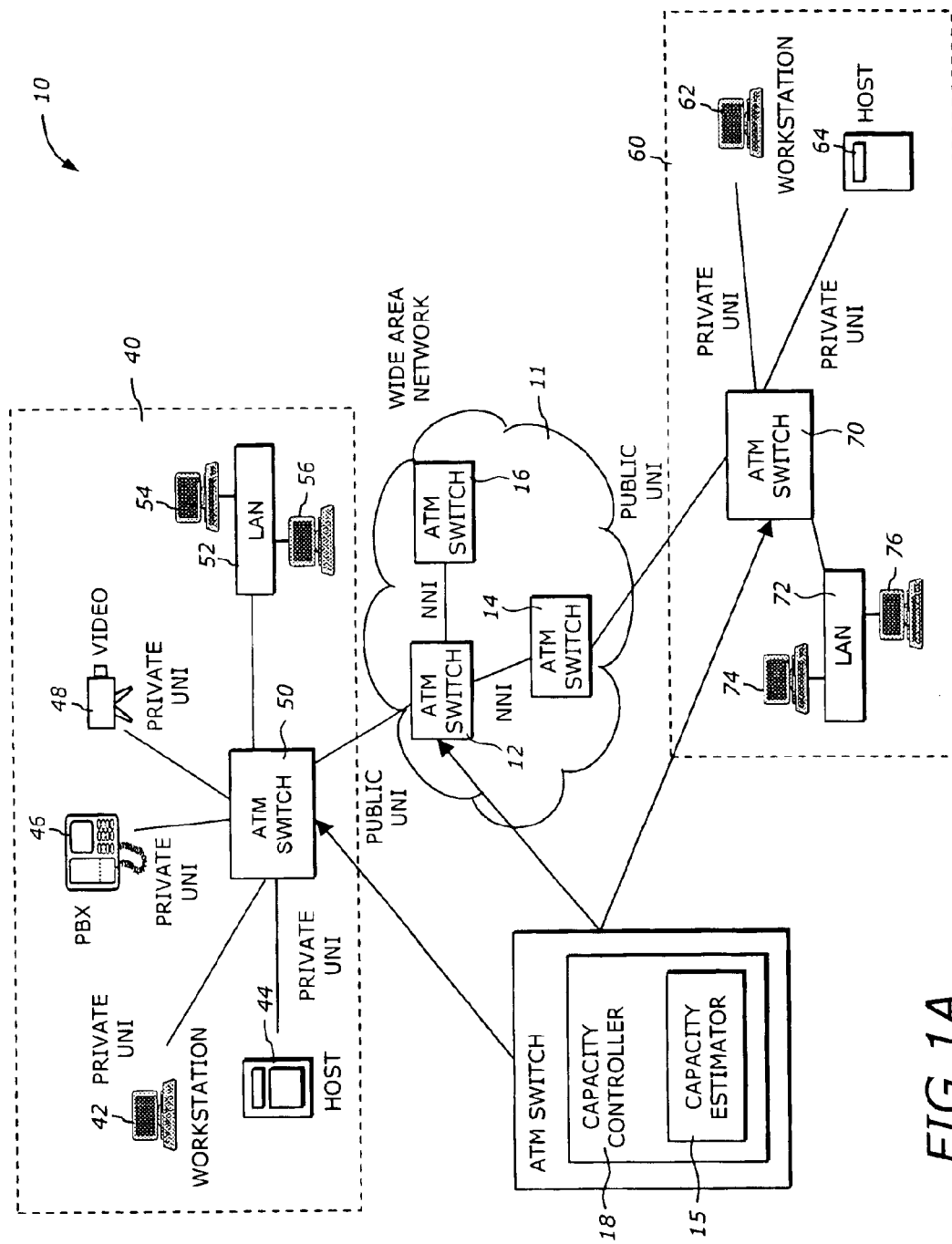
FIG. 1A shows a network system in which one embodiment of the invention can be practiced.

A method and apparatus are described for determining an equivalent capacity of a transport device in a network switch for a traffic data stream. A data collector collects at least one traffic parameter for the traffic data stream arriving at a queue of the transport device for a specified quality of service (QoS) class. A bandwidth estimator is coupled to the data collector to estimate an effective bandwidth using the at least one traffic parameter. The estimated effective bandwidth corresponds to the equivalent capacity of the transport device.

The at least one traffic parameter is one of a loss ratio and a traffic density. The data collector includes a cell loss estimator to estimate the loss ratio and a traffic density calculator to calculate the traffic density over a period of predetermined intervals. The loss ratio is a ratio between a number of cells arriving at the queue when the queue is empty and a number of cell arrivals. The traffic density is a number of traffic units arriving at the queue in the interval. A traffic unit is either a cell or a bit in the traffic data stream. The traffic density calculator includes a traffic envelope sampler and a counter. The traffic envelope sampler samples the traffic data stream according to a timing signal corresponding to the predetermined interval. The counter counts the number of traffic units from the sampled traffic data stream. The traffic envelope sampler records the total number of cell arrivals during a pre-defined time interval. The traffic envelope sampler can be implemented by a program polling the network switch at periodic intervals, or by a hardware mechanism that stores the cell arrivals in an array and then reads out in one single operation.

The bandwidth estimator includes a loss ratio normalizer, a local rate estimator, and an effective bandwidth calculator. The loss ratio normalizer normalizes the loss ratio with respect to a maximum ratio and a queue length. The local rate estimator determines a local rate based on the traffic density. The effective bandwidth calculator calculates the effective bandwidth based on the normalized loss ratio and the local rate.

The apparatus may further include a filter to filter the estimated effective bandwidth to provide the equivalent capacity. In one embodiment, the network switch is an Asynchronous Transfer Mode (ATM) switch and the QoS class is one of a constant bit rate (CBR), a variable bit rate (VBR), an unspecified bit rate (UBR), an available bit rate (ABR), and a guaranteed frame rate (GFR). In addition, all multi protocol label switching (MPLS) classes are also supported.

The main advantages of the present invention include an accurate estimate or prediction of bandwidth needed for a service type with a given QoS target.

In the following, the description refers to the ATM model and the PCI bus as an interface ex ample. It is contemplated that the technique is applicable to other models, buses, or network architectures with similar characteristics.

FIG. 1A shows a network system 10 in which one embodiment of the invention can be practiced. The network system 10 includes a wide area network (WAN) 11, subnetworks 40 and 60. In the network system 10, there may be a number of local area networks (LANs), such as those included in the subnetworks 40 and 60.

Subnetworks 40 and 60 are coupled to the WAN 11 via public user network interface (UNI) links to exchange messages via ATM switches or nodes. The WAN 11 includes ATM switches 12, 14, and 16. The ATM switches 12, 14, and 16 are linked by network-network interface (NNI) links. The NNI links may be private NNI (PNNI). In particular, the ATM switch 12 and the ATM switch 14 are linked by an NNI link configured to estimate and/or control capacity of a transport device. A transport device may include a port, a trunk, or a switching fabric.

The subnetwork 40 includes an ATM switch 50, a workstation 42, a host machine 44, a PBX system 46, a video system 48, a local area network (LAN) 52, computers 54 and 56. The computers 54 and 56 are connected to the LAN 52. The workstation 42, the host machine 44, the PBX 46, the video system 48, and the LAN 52 are linked to the ATM switch 50 by private user-network interface (UNI) links. In particular, the ATM switch 50 is configured to estimate and/or control capacity of a transport device.

Similarly, the subnetwork 60 includes an ATM switch 70, a workstation 62, a host machine 64, a local area network (LAN) 72, and computers 74 and 76. The computers 74 and 76 are connected to the LAN 72. The workstation 62, the host machine 64, and the LAN 72 are linked to the ATM switch 70 by private user-network interface (UNI) links. In particular, the ATM switch 70 is configured to estimate and/or control capacity of a transport device.

The topology shown in FIG. 1A is for illustrative purposes only. Other network topologies and/or configurations are possible. Each of the ATM switches 12, 14, 50, and 70 is configured to have a capacity controller 18 which includes a capacity estimator 15. The capacity estimator 15 provides an estimate of the capacity of the transport device. In one embodiment, the capacity estimator 15 is implemented in a computer system.

Figure 1B:
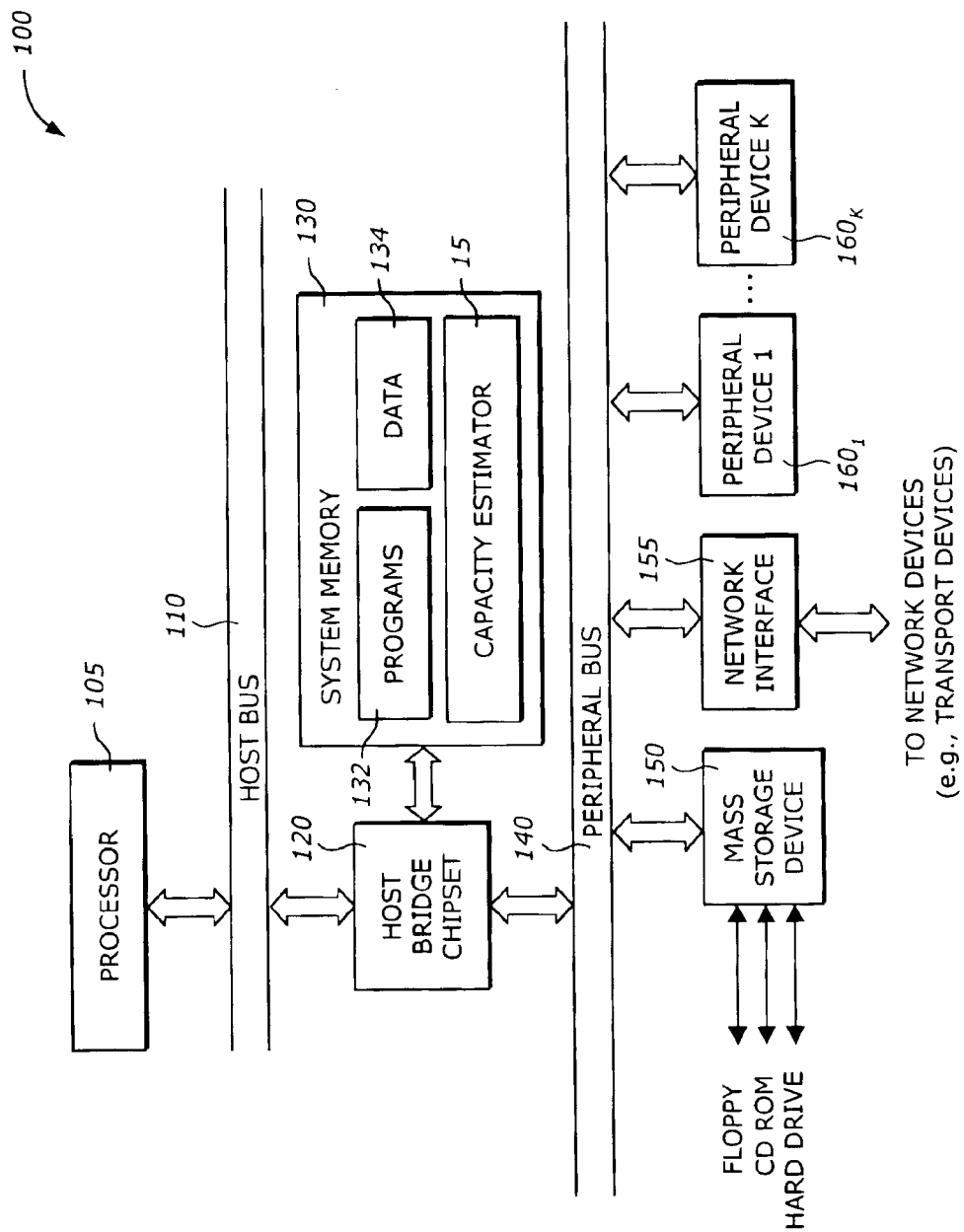
FIG. 1B shows a computer system in which one embodiment of the invention can be practiced.

FIG. 1B shows a computer system 100 in which one embodiment of the invention can be practiced. The computer system 100 may be used as part of an ATM switch, a host machine, a workstation, a LAN, and any other system or subsystem connected to tie network. The computer system 100 include a processor 105, a host bus 110, a host bridge chipset 120, a system memory 130, a peripheral bus 140, a mass storage device 150, a network interface device 155, and K peripheral devices $160_1$ to $160_K$.

The processor 105 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 120 includes a number of interface circuits to allow the host processor 105 access to the system memory 130 and the peripheral bus 140. The host bridge chipset 120 may include a memory controller, a bus interface circuit, and an I/O controller. The memory controller provides an interface to the system memory 130. The I/O controller provides control of I/O functions.

The system memory 130 represents one or more mechanisms for storing information. For example, the system memory 130 may include non-volatile or volatile memories. Examples of these memories include flash memory, read only memory (ROM), or random access memory (RAM). The system memory 130 contains a program 132, a data storage 134, and the capacity estimator 15 as shown in FIG. 1A. Of course, the system memory 130 preferably contains additional software (not shown), which is not necessary to understanding the invention.

The peripheral bus 160 provides bus interface to the mass storage device 150, the network interface 155, and the peripheral devices $160_1$ to $160_K$. In one embodiment, the peripheral bus 160 is the peripheral component interconnect (PCI) bus.

The mass storage device 150 include CD ROM, floppy diskettes, and hard drives. The mass storage device 150 stores non-volatile information such as programs or data. The mass storage device 150 provides a mechanism to read machine-readable media. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The network interface device 155 provides interface to a network such as ATM, LAN, WAN, etc., or other network devices such as a transport device, e.g., a port, trunk, or switch fabric. In one embodiment, the network interface 155 includes a buffer queue to receive a traffic data stream and a capacity adjuster to adjust the capacity of a queueing subsystem of transport device. The traffic data stream may enter or exit the network switch as implemented by the computer system 100. The peripheral devices $160_1$ to $160_K$ may include an audio device, a multimedia device, a modem, a printer controller, etc.

Figure 2:
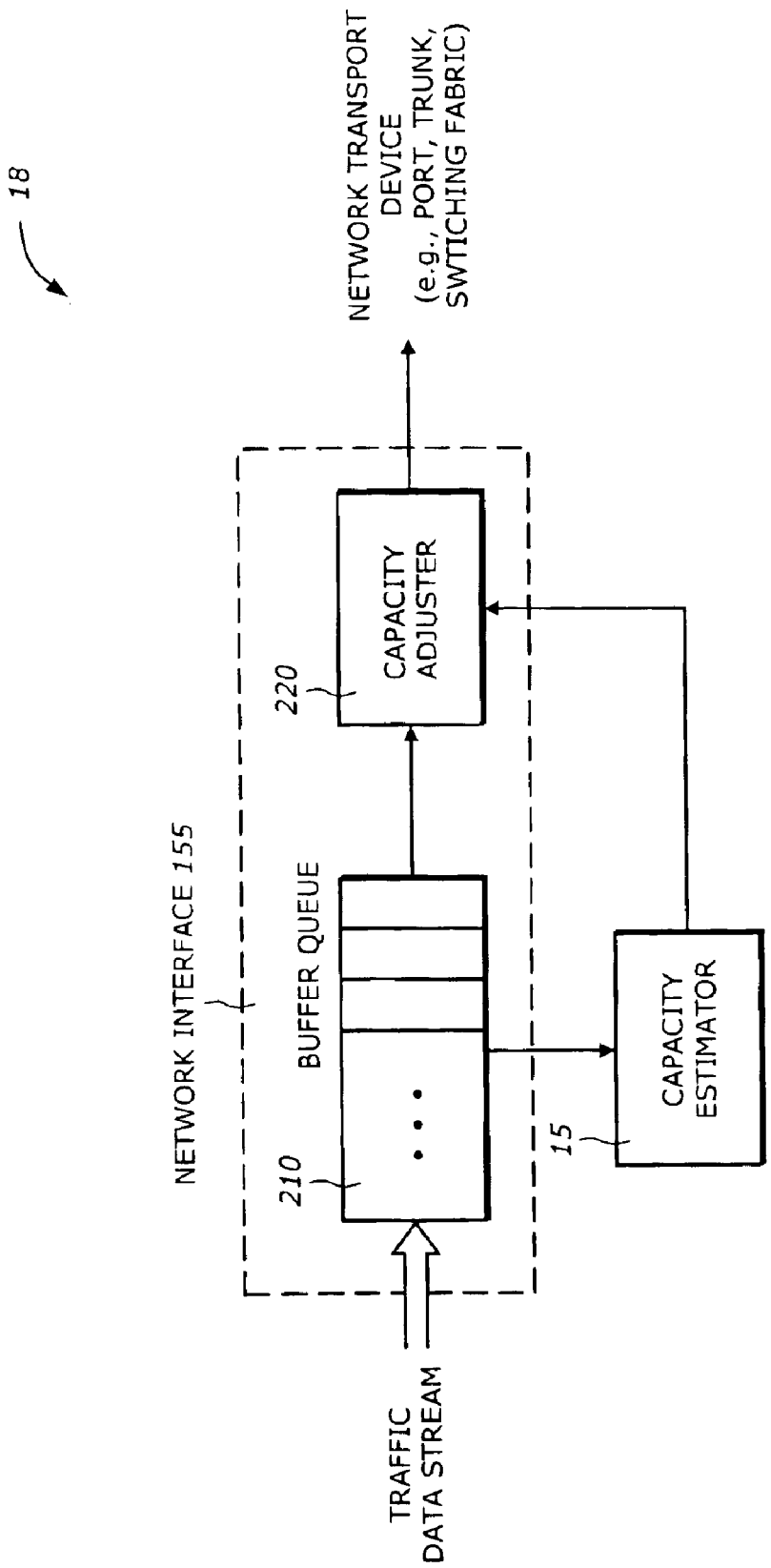
FIG. 2 shows a capacity controller according to one embodiment of the invention.

FIG. 2 shows a capacity controller 18 according to one embodiment of the invention. The capacity controller 18 includes a buffer queue 210, a capacity adjuster 220, and a capacity estimator 15. The capacity controller 18 performs on-line or real-time measurements of traffic data to provide accurate estimates of the equivalent capacity so that the capacity of the transport device in the network switch can be adjusted according to a specified QoS class.

The buffer queue 210 receives the traffic data stream arriving at the network switch. The buffer queue 210 has a queue length M determined as the maximum size of the queue according to some traffic unit, e.g., number of cells or bits. The capacity adjuster 220 generates adjustment commands or parameters to adjust the capacity of the network transport device according to an estimated or predicted equivalent capacity provided by the capacity estimator 15. The capacity estimator 15 collects the statistics of the traffic data stream (e.g., arrival counts) arriving at the queue and generates an equivalent capacity based on the on-line or real-time measurements of the traffic data.

Figure 3:
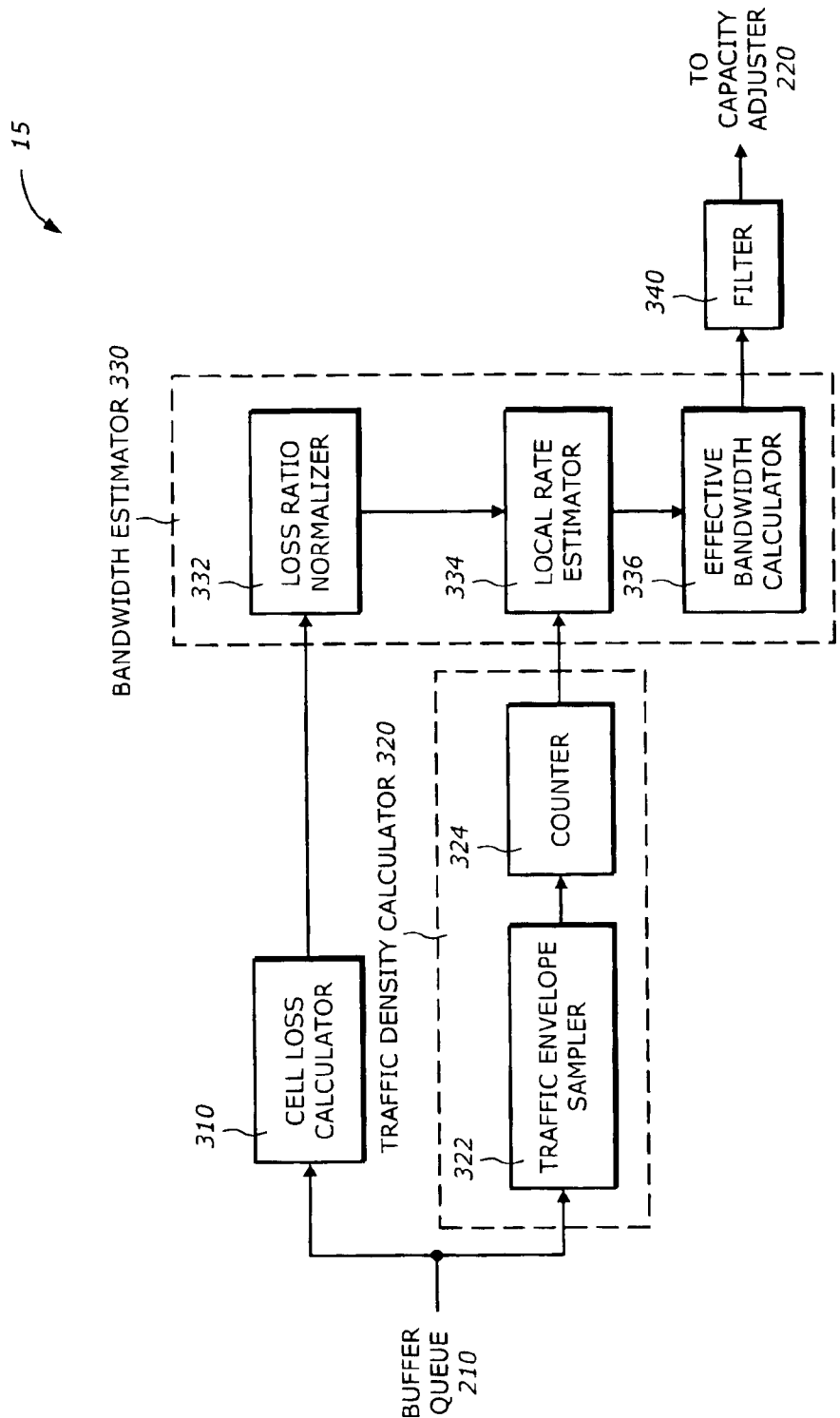
FIG. 3 shows a capacity estimator.

FIG. 3 shows a capacity estimator 15. The capacity estimator 15 includes a cell loss calculator 310, a traffic density calculator 320, a bandwidth estimator 330, and a filter 340. The capacity estimator 15 may be implemented as a specialized hardware device, a software in a computer system such as one shown in FIG. 1A, or any combination thereof.

The cell loss estimator 310 measures or estimates the cell loss ratio, $CLR_0$, of a zero-buffer system. The cell loss ratio $CLR_0$ is a ratio between the number of cells that arrive when the queue is empty and the total number of arrivals. The cell loss estimator 310 can be realized by a dedicated hardware device or chipset, a program or code, a firmware, or a look-up table.

The traffic density calculator 320 calculates the traffic density or the arrival counts. The traffic density $X_k$ is defined as the number of cells or bits arriving at the queue for a specified continuous time interval. The traffic densities $X_k$'s are collected over a period of predetermined intervals. The traffic density calculator 320 includes a traffic envelope ampler 322 and a counter 324. The traffic envelope sampler 322 samples the traffic data stream according to a timing signal corresponding to the predetermined interval. This timing signal may come from a programmable interval timer. The traffic envelope sampler 322 records the total number of cell arrivals during a pre-defined time interval. The traffic envelope sampler 322 can be implemented by a program polling the network switch at periodic intervals, or by a hardware mechanism that stores the cell arrivals in an array and then reads out in one single operation. The counter 324 counts the number of traffic units from the sampled traffic data stream. The traffic unit may be the message cell or the bit of the message. The counter 324 may be part of a hardware register that contains the arrival counts for a selected queue over a number of consecutive time slices (f a programmable time interval T.

The bandwidth estimator 330 estimates an effective bandwidth of the network transport device using the collected traffic parameters. The estimated effective bandwidth corresponds to the equivalent capacity of the traffic stream carried by the transport device with a specified QoS target. The traffic parameters include the cell loss ratio $CLR_0$ and the traffic densities $X_k$'s. The bandwidth estimator 330 includes a loss ratio normalizer 332, a local rate estimator 334, and an effective bandwidth calculator 336.

The loss ratio normalizer 332 normalizes the loss ratio with respect to a maximum ratio and a queue length. The maximum loss ratio, $CLR_{max}$, is the target maximum cell loss ratio, i.e., the maximum proportion of cells that are allowed to be lost. Typical values of $CIR_{max}$ are between $10^{-6}$ to $10^{-9}$. The queue length M is the maximum size of the queue in terms of the traffic unit. The loss ratio normalizer 332 computes the normalized loss ratio δ as follows:

$$\delta = \{ln(CLR^0) - ln(CLR_{max})\}/M \quad (1)$$

where ln is the logarithmic function.
The local rate estimator 334 estimates the local rate λ(δ) based on the normalized loss ratio d and the traffic densities $X_k$'s as follows:

$$\lambda(\delta) = (1/T)*ln\{(1/N)*\Sigma_k e^{\delta X_k}\} \text{ for } k=1, \ldots, N \quad (2)$$

where T is the measurement interval, and N is a predetermined integer number representing, the total number of measurements.
The effective bandwidth calculator 336 calculates the effective bandwidth E as follows:

$$E = \lambda(\delta)/\delta \quad (3)$$

E is a function of the measurement interval T and the total number of measurements N and is written as E(T,N).

The filter 340 filters the estimated effective bandwidth E to provide the equivalent capacity EC of the transport device. The equivalent capacity EC is then forwarded to the capacity adjuster 220 (FIG. 2). The filter 340 can be realized by a number of methods.
Some of the filtering methods are:
1) Use a linear combination for the effective bandwidth:

$$EC = A*E(T,N) + B \quad (4)$$

where A and B are two constants.

2) Select the highest of the most recent L primary estimators where L is an integer constant.
3) Select the highest of the estimators by successively grouping measurement data in groups and perform the estimation over a range of different combinations of T's and N's.

Figure 4:
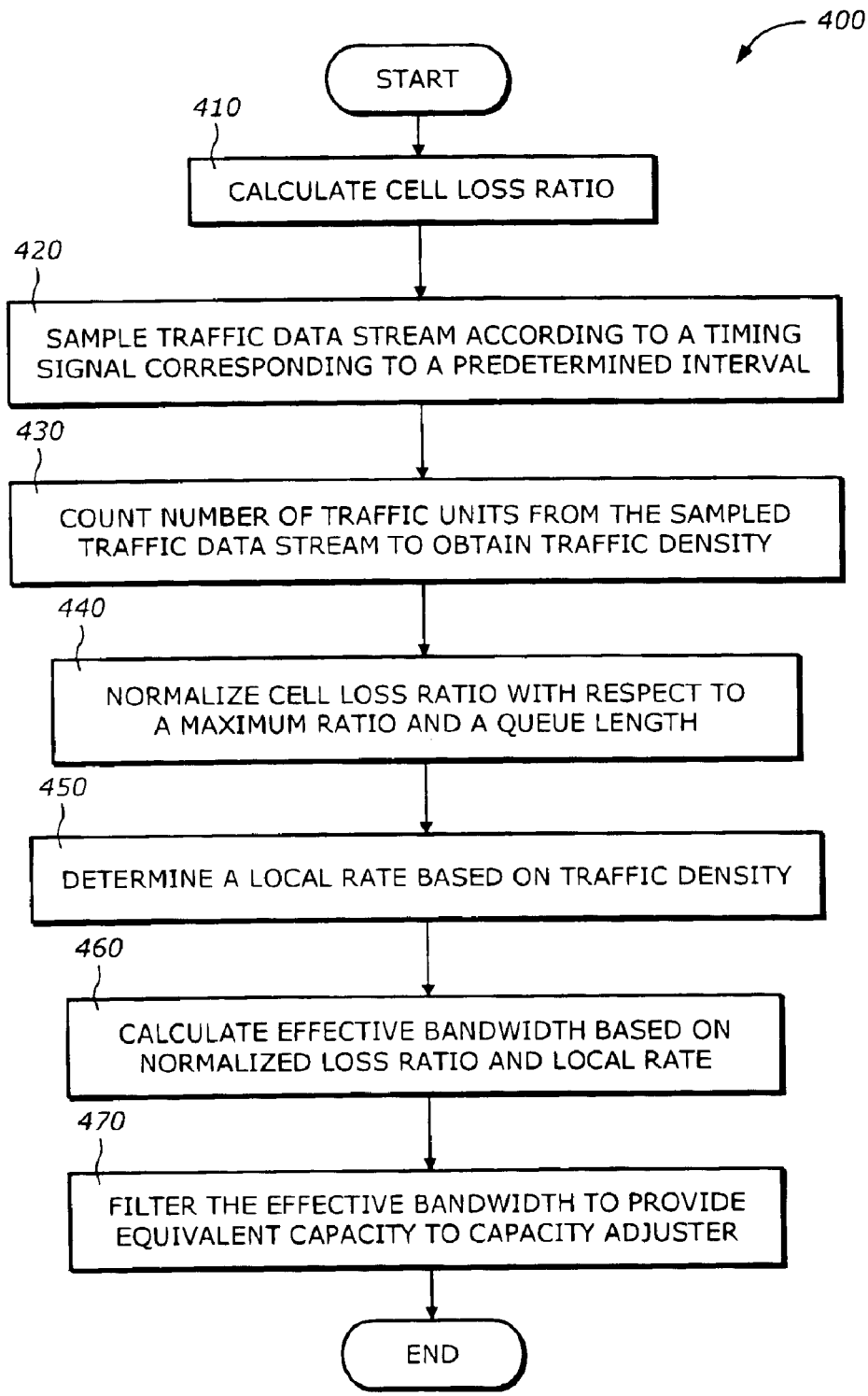
FIG. 4 shows a flowchart for a process to determine an equivalent capacity.

FIG. 4 shows a flowchart for a process 400 to determine an equivalent capacity.

Upon START, the process 400 calculates the cell loss ratio ($CLR_0$) (Block 410). The CLR0 is a ratio between the number of cells that arrive when the queue is empty and the total number of cell arrivals. Then, the process 400 samples the traffic data stream according to a timing signal corresponding to a predetermined interval (Block 420). This can be performed by polling the network switch or storing the arrivals in an array and then reading out in one single operation. The timing signal may come from a programmable timer. Then, the process 400 counts the number of traffic units from the sampled traffic data stream to obtain the traffic density $X_k$ (Block 430).

Next, the process 400 begins to estimate the bandwidth by first normalizing the cell loss ratio CLR with respect to a maximum ratio, $CLR_{max}$ and a queue length M (Block 440). The maximum ratio represents the maximum proportion of cells that are allowed to be lost. The typical value of $CLR_{max}$ is between $10^{-6}$ to $10^{-9}$. Then, the process 400 determines a local rate based on the traffic density (Block 450). Then, the process 400 calculates the effective bandwidth based on the normalized loss ratio and the local rate (Block 460).

Next, the process 400 filters the effective bandwidth to provide the equivalent capacity to the capacity adjuster to adjust the network transport device. Then, the process 400 is terminated.

A technique has been described to determine an equivalent capacity of a transport device in a network switch for a traffic data stream. A data collector collects at least one traffic parameter for the traffic data stream arriving at a queue of the transport device for a specified quality of service (QoS) class. A bandwidth estimator is coupled to the data collector to estimate an effective bandwidth using the at least one traffic parameter. The estimated effective bandwidth corresponds to the equivalent capacity of the transport device.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus to determine an equivalent capacity of a transport device in a network switch for a traffic data stream, the apparatus comprising:

a data collector to collect statistics of the traffic data stream in a predetermined interval to determine at least one traffic parameter for the traffic data stream arriving at a queue of the transport device for a specified quality of service (QoS) class;

a bandwidth estimator coupled to the data collector to estimate an effective bandwidth using the at least one traffic parameter, the estimated effective bandwidth corresponding to the equivalent capacity of the transport device; and a filter coupled to the bandwidth estimator to filter the estimated effective bandwidths to provide the equivalent capacity.

2. The apparatus of claim 1 wherein the at least one traffic parameter is one of a loss ratio and a traffic density.

3. The apparatus of claim 2 wherein the data collector comprises:
a cell loss estimator to estimate the loss ratio; and
a traffic density calculator to calculate the traffic density over the predetermined interval.

4. The apparatus of claim 3 wherein the loss ratio is a ratio between a number of cells arriving at the queue when the queue is empty and a number of cell arrivals.

5. The apparatus of claim 3 wherein the traffic density is a number of traffic units arriving at the queue in the predetermined interval, the number of traffic units being one of a number of cells and a number of bits.

6. The apparatus of claim 5 wherein the traffic density calculator comprises:
a sampler to sample the traffic data stream according to a timing signal corresponding to the predetermined interval; and
a counter coupled to the sampler to count the number of traffic units from the sampled traffic data stream.

7. The apparatus of claim 5 wherein the bandwidth estimator comprises:
a loss ratio normalizer to normalize the loss ratio with respect to a maximum ratio and a queue length;
a local rate estimator to determine a local rate based on the traffic density; and
an effective bandwidth calculator to calculate the effective bandwidth based on the normalized loss ratio and the local rate.

8. The apparatus of claim 1 wherein the network switch is one of an Asynchronous Transfer Mode (ATM) switch, a Multi Protocol Label Switching (MPLS) switch, a frame relay switch, and a voice switch.

9. The apparatus of claim 8 wherein the QoS class is one of a constant bit rate (CBR), a variable bit rate (VBR), an unspecified bit rate (UBR), an available bit rate (ABR), a guaranteed frame rate (GFR), and a MPLS class.

10. A method to determine an equivalent capacity of a transport device in a network switch for a traffic data stream, the method comprising:
collecting, by a data collector, statistics of the traffic data stream in a predetermined interval to determine at least one traffic parameter for the traffic data stream arriving at a queue of the transport device for a specified quality of service (QoS) class;
estimating an effective bandwidth by a bandwidth estimator using the at least one traffic parameter, the estimated effective bandwidth corresponding to the equivalent capacity of the transport device; and
filtering the estimated effective bandwidths by a filter to provide the equivalent capacity.

11. The method of claim 10 wherein the at least one traffic parameter is one of a loss ratio and a traffic density.

12. The method of claim 11 wherein collecting comprises:
estimating the loss ratio; and
calculating the traffic density over the predetermined interval.

13. The method of claim 12 wherein the loss ratio is a ratio between a number of cells arriving at the queue when the queue is empty and a number of cell arrivals.

14. The method of claim 12 wherein the traffic density is a number of traffic units arriving at the queue in the predetermined interval, the number of traffic units being one of a number of cells and a number of bits.

15. The method of claim 14 wherein calculating the traffic density comprises:
sampling the traffic data stream according to a timing signal corresponding to the predetermined interval; and
counting the number of traffic units from the sampled traffic data stream.

16. The method of claim 14 wherein estimating the effective bandwidth comprises:
normalizing the loss ratio with respect to a maximum ratio and a queue length;
determining a local rate based on the traffic density; and
calculating the effective bandwidth based on the normalized loss ratio and the local rate.

17. The method of claim 10 wherein the network switch one of an Asynchronous Transfer Mode (ATM) switch, a Multi Protocol Label Switching (MPLS) switch, a frame relay switch, and a voice switch.

18. The method of claim 17 wherein the QoS class is one of a constant bit rate (CBR), a variable bit rate (VBR), an unspecified bit rate (UBR), an available bit rate (ABR), a guaranteed frame rate (GFR), and a MPLS class.

19. A computer program product comprising:
a computer usable medium having computer program code embodied therein for determining an equivalent capacity of a transport device in a network switch for a traffic data stream, the computer program product having:
computer readable program code for collecting statistics of the traffic data stream in a predetermined interval to determine at least one traffic parameter for the traffic data stream arriving at a queue of the transport device for a specified quality of service (QoS) class;
computer readable program code for bandwidth estimating an effective bandwidth by a bandwidth estimator using the at least one traffic parameter, the estimated effective bandwidth corresponding to the equivalent capacity of the transport device; and
computer readable program code for filtering the estimated effective bandwidths by a filter to provide the equivalent capacity.

20. The computer program product of claim 19 wherein the at least one traffic parameter is one of a loss ratio and a traffic density.

21. The computer program product of claim 20 wherein the computer readable program code for collecting comprises:
computer readable program code for estimating the loss ratio; and
computer readable program code for calculating the traffic density over the predetermined interval.

22. The computer program product of claim 21 wherein the loss ratio is a ratio between a number of cells arriving at the queue when the queue is empty and a number of cell arrivals.

23. The computer program product of claim 21 wherein the traffic density is a number of traffic units arriving at the queue in the predetermined interval, the number of traffic units being one of a number of cells and a number of bits.

24. The computer program product of claim 23 wherein the computer readable program code for calculating the traffic density comprises:
computer readable program code for sampling the traffic data stream according to a timing signal corresponding to the predetermined interval; and
computer readable program code for counting the number of traffic units from the sampled traffic data stream.

25. The computer program product of claim 23 wherein the computer readable program code for bandwidth estimating comprises:
computer readable program code for normalizing the loss ratio with respect to a maximum ratio and a queue length;

computer readable program code for determining a local rate based on the traffic density; and computer readable program code for calculating the effective bandwidth based on the normalized loss ratio and the local rate.

26. The computer program product of claim 19 wherein the network switch is one of an Asynchronous Transfer Mode (ATM) switch, a Multi Protocol Label Switching (MPLS) switch, a frame relay switch, and a voice switch.

27. The computer program product of claim 26 wherein the QoS class is one of a constant bit rate (CBR), a variable bit rate (VBR), an unspecified bit rate (UBR), an available bit rate (ABR), a guaranteed frame rate (GFR), and a MPLS class.

28. A system interfacing to a network, the system comprising:

a queue to receive a traffic data stream to a transport device in a network switch;

a capacity adjuster coupled to the queue to adjust capacity of the transport device based on an equivalent capacity; and a capacity estimator coupled to the queue and the capacity adjuster to provide the equivalent capacity, the capacity estimator comprising:

a data collector to collect statistics of the traffic data stream in a predetermined interval to determine at least one traffic parameter for the traffic data stream arriving at the queue of the transport device for a specified quality of service (QoS) class, and a bandwidth estimator coupled to the data collector to estimate an effective bandwidth using the at least one traffic parameter, the estimated effective bandwidth corresponding to the equivalent capacity of the transport device.

29. The system of claim 28 wherein the capacity estimator further comprises:

a filter coupled to the bandwidth estimator to filter the estimated effective bandwidths to provide the equivalent capacity.

30. The system of claim 28 wherein the at least one traffic parameter is one of a loss ratio and a traffic density.

31. The system of claim 30 wherein the data collector comprises:

a cell loss estimator to estimate the loss ratio; and a traffic density calculator to calculate the traffic density over the predetermined interval.

32. The system of claim 31 wherein the loss ratio is a ratio between a number of cells arriving at the queue when the queue is empty and a number of cell arrivals.

33. The system of claim 31 wherein the traffic density is a number of traffic units arriving at the queue in the predetermined interval, the number of traffic units being one of a number of cells and a number of bits.

34. The system of claim 33 wherein the traffic density calculator comprises:

a sampler to sample the traffic data stream according to a timing signal corresponding to the predetermined interval; and a counter coupled to the sampler to count the number of traffic units from the sampled traffic data stream.

35. The system of claim 33 wherein the bandwidth estimator comprises:

a loss ratio normalizer to normalize the loss ratio with respect to a maximum ratio and a queue length;

a local rate estimator to determine a local rate based on the traffic density; and an effective bandwidth calculator to calculate the effective bandwidth based on the normalized loss ratio and the local rate.

36. The system of claim 28 wherein the network switch is one of an Asynchronous Transfer Mode (ATM) switch, a Multi Protocol Label Switching (MPLS) switch, a frame relay switch, and a voice switch.

37. The system of claim 36 wherein the QoS class is one of a constant bit rate (CBR), a variable bit rate (VBR), an unspecified bit rate (UBR), an available bit rate (ABR), a guaranteed frame rate (GFR), and a MPLS class.

38. An apparatus to determine an equivalent capacity of a transport device in a network switch for a traffic data stream, the apparatus comprising:

means for collecting, by a data collector, statistics of the traffic data stream in a predetermined interval to determine at least one traffic parameter for the traffic data stream arriving at a queue of the transport device for a specified quality of service (QoS) class;

means for estimating an effective bandwidth by a bandwidth estimator using the at least one traffic parameter, the estimated effective bandwidth corresponding to the equivalent capacity of the transport device; and means for filtering the estimated effective bandwidths by a filter to provide the equivalent capacity.

39. The apparatus of claim 38 wherein the at least one traffic parameter is one of a loss ratio and a traffic density.

40. The apparatus of claim 39 wherein the means for collecting comprises:

means for estimating the loss ratio; and means for calculating the traffic density over the predetermined interval.

41. The apparatus of claim 40 wherein the loss ratio is a ratio between a number of cells arriving at the queue when the queue is empty and a number of cell arrivals.

42. The apparatus of claim 40 wherein the traffic density is a number of traffic units arriving at the queue in the predetermined interval, the number of traffic units being one of a number of cells and a number of bits.

43. The apparatus of claim 42 wherein the means for calculating the traffic density comprises:

means for sampling the traffic data stream according to a timing signal corresponding to the predetermined interval; and means for counting the number of traffic units from the sampled traffic data stream.

44. The apparatus of claim 42 wherein the means for estimating the effective bandwidth comprises:

means for normalizing the loss ratio with respect to a maximum ratio and a queue length;

means for determining a local rate based on the traffic density; and means for calculating the effective bandwidth based on the normalized loss ratio and the local rate.

45. The apparatus of claim 38 wherein the network switch one of an Asynchronous Transfer Mode (ATM) switch, a Multi Protocol Label Switching (MPLS) switch, a frame relay switch, and a voice switch.

46. The apparatus of claim 45 wherein the QoS class is one of a constant bit rate (CBR), a variable bit rate (VBR), an unspecified bit rate (UBR), an available bit rate (ABR), a guaranteed frame rate (GFR), and a MPLS class.

* * * * *